United States Patent [19]
Schindler

[11] 3,828,985
[45] Aug. 13, 1974

[54] DOSING VALVE
[75] Inventor: Claude Schindler, Geneva, Switzerland
[73] Assignee: Zyma S.A., Nyon, Switzerland
[22] Filed: June 26, 1972
[21] Appl. No.: 266,357

[30] Foreign Application Priority Data
July 6, 1971  Switzerland.......................... 9903/71

[52] U.S. Cl................. 222/207, 222/209, 222/383, 222/496
[51] Int. Cl............................................. B67d 5/42
[58] Field of Search .......... 222/207, 209, 378, 380, 222/449, 511, 518, 212, 383, 494–496; 417/472

[56] References Cited
UNITED STATES PATENTS
2,824,672  2/1958  Wersching.......................... 222/207
2,923,441  2/1960  McConnohie .................. 222/212 X
3,141,579  7/1964  Medlock.......................... 222/212 X
3,197,082  7/1965  Palombo............................. 222/207
3,451,597  6/1969  Watson.............................. 222/207

Primary Examiner—Stanley H. Tollberg
Assistant Examiner—John P. Shannon
Attorney, Agent, or Firm—Stevens, Davis, Miller & Mosher

[57] ABSTRACT

A dosing valve for liquid or pasty products includes a hollow valve body with an inner chamber, a normally open inlet communicating with a recipient of a product, and an outlet normally closed by a spring-urged clapper. Part of the body can be elastically deformed to reduce the volume of the chamber and compress the product therein to close the inlet, open the outlet and deliver a discrete dose of the product.

6 Claims, 5 Drawing Figures

DOSING VALVE

The invention relates to dosing valves for liquid or pasty products.

One type of dosing valve comprises a retaining clapper urged by a spring towards a closed position in which it retains a dose of the product inside the valve body above the clapper, a retaining member mounted between the clapper and a separating element pierced with at least one inlet orifice for the passage of a product contained in a recipient, and an outlet opening in the lower part of the valve body.

Dosing valves of the above type adapted to be fitted to a deformable recipient containing a product to be distributed have already been proposed, the dose of product being evacuated by squeezing the deformable recipient, which causes the opening of the clapper under the effect of the product under pressure.

Other types of dosing valves which can be actuated to deliver a dose by acting on a movable part of the valve (rather than on a deformable recipient) are known, but generally require fairly complex mechanisms.

The present invention aims to provide a dosing valve of the first above type which can be operated without manipulation of a recipient to which the dosing valve is fitted.

According to the invention, a dosing valve for liquid and pasty products comprises a hollow valve body with an inner chamber, an orifice for the inlet of a product into the chamber, a piece movable in the valve body between a first position in which the inlet orifice is open and a second position in which the inlet orifice is closed, an orifice for the outlet of the product from the valve body, a valve clapper movable in the valve body between a first position in which it blocks a passageway from the chamber to the outlet orifice and a second position in which said passageway is open, and a spring urging the clapper from its second to its first position, the valve body including a deformable part which can be deformed from a first position in which the piece and clapper are in their first positions and the chamber is filled with the product entering via the inlet orifice to a second position in which the volume of the chamber is reduced such that the product therein is compressed to move the piece and clapper to their second positions in which dose of product is delivered through the outlet opening.

The accompanying drawings show, by way of example, three embodiments of the dosing valve according to the invention. In the drawings.

Figure 1:
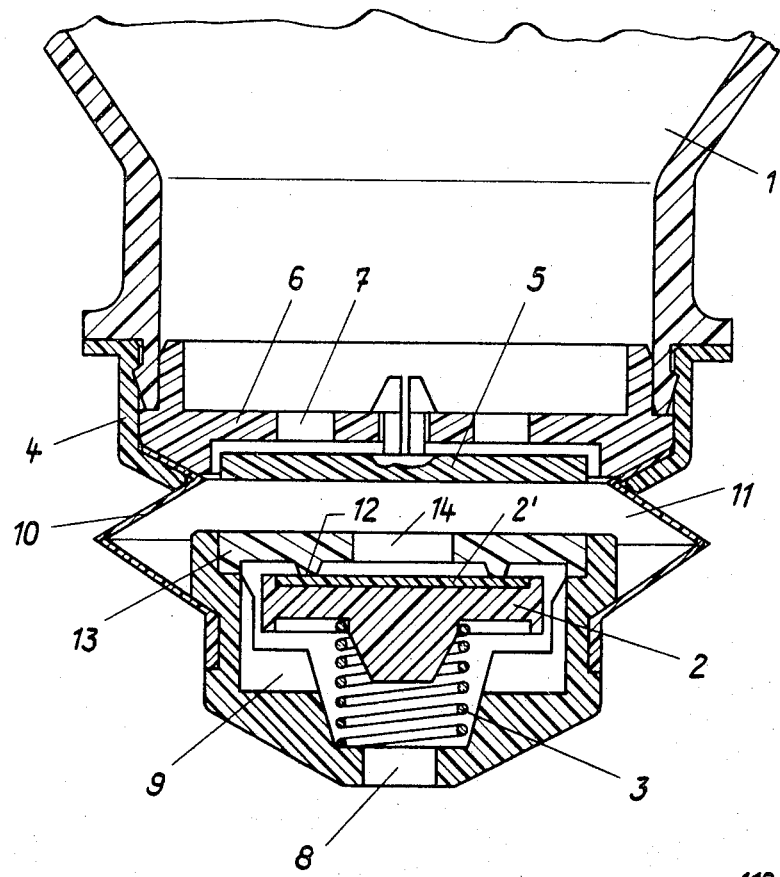
FIG. 1 is an axial cross-section of a first embodiment.

The dosing valve shown in FIG. 1 is intended for the distribution of a liquid or pasty product, for example liquid soap contained in a recipient 1. This valve includes a hollow valve body 4 in moulded synthetic plastics material, a retaining clapper 2, and a spring 3 urging the clapper 2 into a closed position in which it retains a dose of the product in a chamber 11 in the valve body 4 above the clapper 2. A retaining disk 5 is mounted with play between the clapper 2 and a separating member 6 pierced with inlet orifices 7 for the passage of the product from the recipient 1 into the chamber 11.

An outlet orifice 8 is provided in the lower part of the valve body 4. The clapper 2 is mounted in a substantially rigid support 9 fixed to an elastically deformable part 10 of the valve body defining the chamber 11 for the reception of a dose of the product. Although the deformable part 10 is shown joined to the valve body 4, it could be made in one piece with the latter.

In its closed position, shown in FIG. 1, the clapper 2 is applied by its sealing point 2' against a seat 12 of a plate 13 closing the support 9, this plate 13 being pierced centrally with an inlet opening 14.

In operation, by upwardly pushing the support 9, a dose of the product in the chamber 11 is compressed between the disk 5 and the clapper 2. The disk 5 is pushed by the product under pressure against the separating member 6 thus closing the orifices 7 and, under the effect of the pressure of the product, the clapper 2 moves away from its seat 12 against the force of spring 3 to allow the dose to pass out through the outlet orifice 8. The support 9 returns to its initial position due to the elasticity of the deformable part 10, and simultaneously a new dose of product is sucked into the chamber 11.

Figure 2:
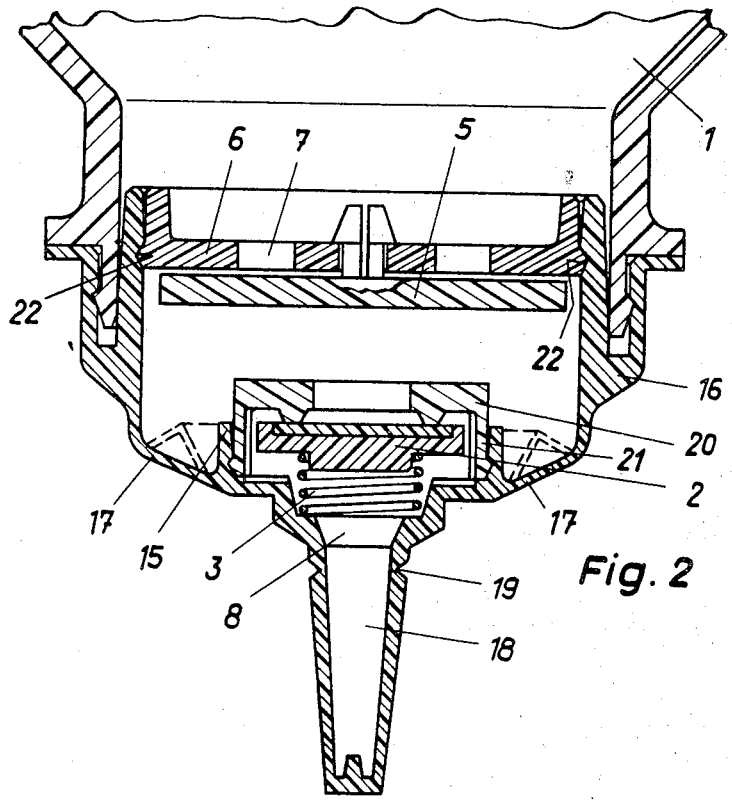
FIG. 2 is a view similar to FIG. 1 for a second embodiment.
Figure 3:
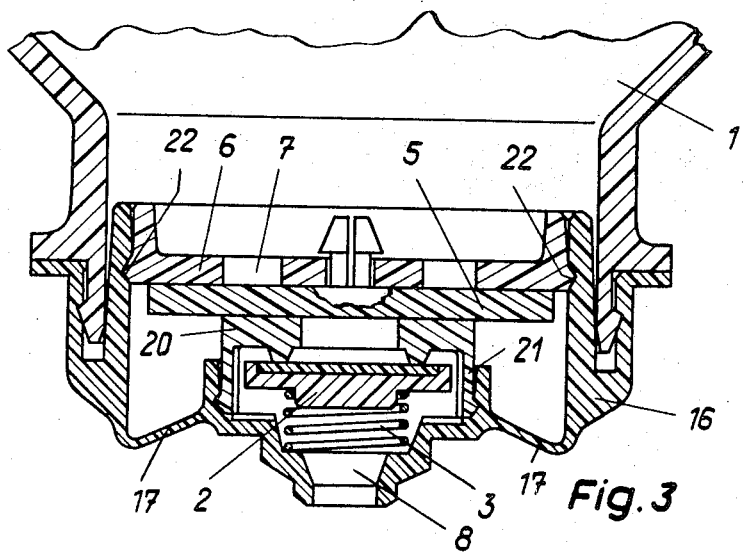
FIG. 3 shows the second embodiment in another position.

In the embodiment shown in FIGS. 2 and 3, the same reference numerals designate the same parts as in FIG. 1. The retaining clapper 2 is mounted in a piece fitted to a support 15 moulded in one piece with a valve body 16 in a synthetic plastics material. This valve body 16 includes a relatively thin deformable part 17, provided during moulding, which can elastically deform from the position shown in FIG. 2 to the position shown in FIG. 3, as will be described hereinafter. This thin part 17 could, in a variant, comprise an intermediary concertina fold as indicated in dashed lines in FIG. 2.

The valve body 16 has at its lower end an outlet orifice 8 closed by a removable desoperculator member or cap 18 with a rupture band 19.

The seat 12 of the clapper 2 is formed on an apertured disk 20 provided with a flange 21 clipped in the support 15. The separating member 6 is fixed in an internal annular recess 22 of the valve body 16.

FIG. 3 shows the valve body 16 in the position that it adopts after deformation by pressing it upwardly to extract the dose of product from the chamber 11 through the outlet orifice 8, the clapper 2 being opened against the action of its spring 9 as in the preceding embodiment.

In the two described embodiments, if the recipient 1 has flexible walls, the product to be distributed is continuously delivered through the described valve (as opposed to delivery in discrete doses) if the recipient is pressed.

Figure 4:
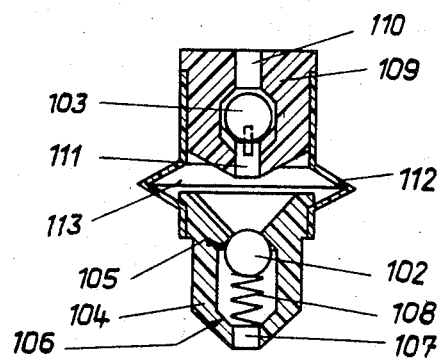
FIG. 4 is an axial cross-section of a third embodiment.

In the embodiment shown in FIG. 4, the disk-like clapper 2 and the retaining disk 5 of the above-described embodiments are respectively replaced by a ball clapper 102 and a retaining ball 103. The ball 102 is mounted in a cavity in a support 104 of a synthetic plastics material having an upper seat 105 and a lower seat 106. The outlet opening 107 is smaller than the opening of the seat 105 which enables the introduction, in said cavity, of the spring 108 and the ball 102 by forcing them through the latter opening.

The ball 103 is mounted in a cavity in a body 109 by forcing it through an upper opening 110. This ball 103 normally rests on ribs surrounding a lower opening 111 to allow passage of the product to be distributed.

The support 104 and the body 109 are connected by a bellows-like deformable part 112 defining a chamber 113 for a dose of a product.

Operation of this embodiment is the same as for the preceding embodiments; however, this arrangement is preferably used with a semi-liquid or pasty product contained in a deformable tube. By pressing the tube, the product passes continuously through the body 109, chamber 113 and support 104 to pass out through the opening 107. To make the product pass out in discrete doses, the support 104 is pressed against the body 109 which forces the product contained in the chamber 113 through the cavity of seat 105 by downwardly displacing the ball 102. Upon releasing the support 104, the part 112 reassumes its initial position and sucks product into the chamber 113, ball 102 being applied against its seat 105 by the spring 108.

Figure 5:
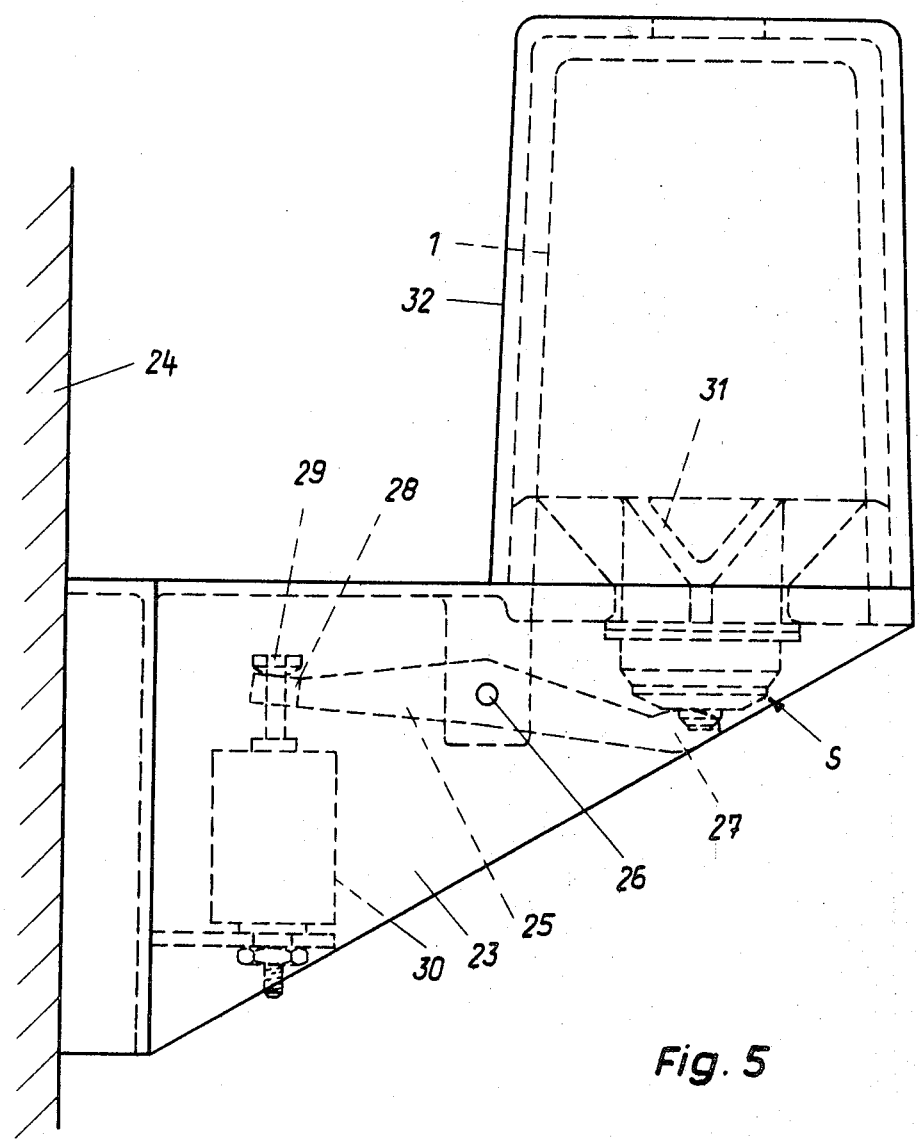
FIG. 5 is a schematic side elevational view of a distributor apparatus fitted with a dosing valve according to the invention.

The described valves may advantageously be incorporated in a liquid soap or similar distributor such as shown in FIG. 5. This distributor comprises a bracket 23, for example, of moulded synthetic plastics material, adapted to be fixed to a wall 24. A lever 25 pivoted about a transversal shaft 26 actuates, by one end 27, a valve S of the type shown in FIGS. 2 and 3. Valve S is fixed under a recipient 1 mounted on a support 31 made by moulding with the bracket 23, with a cap 32 covering the assembly of recipient 1 and valve S. The other forked end 28 of the lever 25 cooperates with a control member 29 actuated by an electromagnet 30 whose excitation circuit is controlled, for example, by means of a push button, not shown. The lever 25 could alternatively be actuated directly by hand or by means of a pedal. The circuit of the electro-magnet 30 could also be controlled by means of a photoelectric cell.

What is claimed is:

1. A dosing valve device for liquid and pasty products, comprising a valve body connected to a container for said product, a first inlet orifice communicating the container with the interior of said valve body, the product entering said interior via gravity, a first movable piece cooperating with said inlet orifice, a second outlet orifice provided in said valve body, a second movable piece cooperating with said outlet orifice, a spring urging said second movable piece to a position in which it retains the product from passing from the interior of said valve body through said outlet orifice, wherein said valve body is provided with a flexible wall which can be deformed from a first position in which the first movable piece opens the inlet orifice and the second piece prevents the product from passing through the outlet orifice, into a second position in which the first piece closes the inlet orifice and the second piece permits the passage of the product through the outlet orifice after having been displaced against the action of said spring by the product entering into said valve body and being compressed by the deformation of said flexible wall.

2. A dosing valve device according to claim 1 wherein the flexible wall of said valve body is formed by a separate membrane element having a horizontal cross section in V form, the angle of the limbs of said V varying by pressing one limb against the other in the axial direction of said movable pieces.

3. A dosing valve device according to claim 1 wherein said flexible wall is made in one piece with said valve body, said wall being of reduced thickness.

4. A dosing valve device according to claim 1 wherein said first movable piece is constituted by a disc cooperating with a perforated cover plate including said inlet orifice and connected to said valve body, and wherein said second movable piece is constituted by a disc urged by said spring against a plate intermediate the first and second movable pieces and provided with a third orifice, the flexible wall being deformable from its first to its second position by pressing the end of the valve body adjacent to the outlet orifice towards the inlet orifice.

5. A dosing valve device according to claim 1 wherein said first and second movable pieces comprise balls.

6. A dosing valve device according to claim 1 wherein said valve body is fitted under a container of liquid soap mounted on a support adapted to be fixed to a wall, and further comprising a lever pivoted about a transversal shaft, said lever engaging at one end said valve body and cooperating at the other end with a control member actuated by electro-magnetic means.

* * * * *